(12) United States Patent
Haraguchi et al.

(10) Patent No.: US 6,232,358 B1
(45) Date of Patent: May 15, 2001

(54) EXPANDABLE RUBBER-MODIFIED STYRENE RESIN COMPOSITIONS

(75) Inventors: Kenji Haraguchi; Taketoshi Kajihara, both of Yokkaichi (JP)

(73) Assignees: Mitsubishi Chemical Foam Plastic Corporation, Tokyo; Mitsubishi Chemical Corporation, Tokyok, both of (JP)

( * ) Notice: Subject to any disclaimer, the term of this patent is extended or adjusted under 35 U.S.C. 154(b) by 0 days.

(21) Appl. No.: 09/151,603

(22) Filed: Sep. 11, 1998

(30) Foreign Application Priority Data

Sep. 12, 1997 (JP) .................................................. 9-268032
Jul. 6, 1998 (JP) ................................................ 10-190323

(51) Int. Cl.$^7$ ..................................................... C08F 36/04
(52) U.S. Cl. ............................................................. 521/148
(58) Field of Search .................................. 521/59, 56, 60, 521/150, 146, 148

(56) References Cited

U.S. PATENT DOCUMENTS

| | | | |
|---|---|---|---|
| 5,196,466 | * | 3/1993 | Piejko .................................. 524/109 |
| 5,231,142 | * | 7/1993 | Tsubokura ........................... 525/316 |
| 5,496,864 | | 3/1996 | Henn et al. ............................ 521/59 |
| 5,525,635 | | 6/1996 | Moberg ................................. 514/588 |
| 5,525,637 | | 6/1996 | Henn et al. ............................ 521/59 |
| 5,635,543 | | 6/1997 | Kaneko et al. ........................ 521/54 |

FOREIGN PATENT DOCUMENTS

| | | |
|---|---|---|
| 0 682 076 | 11/1995 | (EP) . |
| 0 722 974 | 7/1996 | (EP) . |
| 3-182529 | 8/1991 | (JP) . |
| 5-11622 | 1/1993 | (JP) . |
| 5-116227 | 5/1993 | (JP) . |
| 6-228357 | 8/1994 | (JP) . |
| 7-11043 | 1/1995 | (JP) . |
| 7-90105 | 4/1995 | (JP) . |
| 7-188452 | 7/1995 | (JP) . |
| 8-53589 | 2/1996 | (JP) . |
| 8-53590 | 2/1996 | (JP) . |
| 8-59878 | 3/1996 | (JP) . |
| 8-59929 | 3/1996 | (JP) . |
| 8-183874 | 7/1996 | (JP) . |
| 8-188668 | 7/1996 | (JP) . |
| 8-188669 | 7/1996 | (JP) . |
| 8-245822 | 9/1996 | (JP) . |
| 2600607 | 1/1997 | (JP) . |
| 9-40800 | 2/1997 | (JP) . |
| 9-100367 | 4/1997 | (JP) . |
| 9-104782 | 4/1997 | (JP) . |
| 98/29485 | 7/1998 | (WO) . |

\* cited by examiner

*Primary Examiner*—Paul R. Michl
(74) *Attorney, Agent, or Firm*—Oblon, Spivak, McClelland, Maier & Neustadt, P.C.

(57) ABSTRACT

To provide an expandable rubber-modified styrene resin composition that is enabled to obtain a molded foam having a high expansion ratio, an excellent impact resistance and pliability and satisfactory appearance. The expandable rubber-modified styrene resin composition comprises 85 to 99% by weight of a rubber-modified styrene resin containing a rubber particle of a diene polymer dispersed in a continuous phase of a styrene resin and 1 to 15% by weight of a volatile blowing agent whose boiling point is 80° C. or lower, wherein:

the weight-average molecular weight of said continuous phase of styrene resin is 150,000 to 300,000;

the graft ratio of the styrene resin to the diene polymer is 70 to 135%; and, the swelling index of the gel fraction of said diene polymer in toluene at 25° C. is 12 to 25.

13 Claims, No Drawings

EXPANDABLE RUBBER-MODIFIED STYRENE RESIN COMPOSITIONS

BACKGROUND OF THE INVENTION

1. Field of the Invention

The present invention relates to an expandable rubber-modified styrene resin composition to obtain a molded foam having an excellent impact resistance and pliability as well as a high expansion ratio and also relates to a molded foam obtained by said expandable rubber-modified styrene resin composition.

2. Description of the Related Art

A molded foam made from a polystyrene resin is employed widely as a container and a heat insulating material for its excellent shock-absorbing properties and heat-insulating properties as well as easiness in molding into an article. However, because of its insufficient impact resistance and pliability which may cause formation of cracks and breaks, it involves problems such as difficulty in applying to a package for a precision instrument.

On the other hand, a molded foam made from a polypropylene resin requires a large-scaled device for molding although it has excellent impact resistance and pliability. Further, its resin characteristics also requires a transportation from a manufacturer to a molding company in a form of pre-expanded beads. As a result, a production cost becomes disadvantageously high.

Recently, a rubber-modified styrene resin molded foam which is easy to be molded and has improved impact resistance and pliability compared with a polystyrene foam has been proposed in Japanese Laid-Open Patent Publication Nos.3-182529, 5-116227, 7-11043 and 7-90105.

Nevertheless, the impact resistance and the pliability of a conventional molded foam is improved only to a limited and insufficient degree, and attempts to achieve a high expansion ratio result in obtaining a molded foam having a poor appearance due to shrinkage and a reduced strength. Accordingly, it is impossible to use a molded foam as being foamed at a high expansion ratio, resulting in a limitation in package resource saving.

SUMMARY OF THE INVENTION

Therefore, an object of the present invention is to provide an expandable rubber-modified styrene resin composition that is enabled to obtain a molded foam having a high expansion ratio, excellent impact resistance and pliability and satisfactory appearance.

The present invention is an expandable rubber-modified styrene resin composition comprising 85 to 99% by weight of a rubber-modified styrene resin containing a rubber particle of a diene polymer dispersed in a continuous phase of a styrene resin and 1 to 15% by weight of a volatile blowing agent whose boiling point is 80° C. or lower, wherein:

the weight-average molecular weight of said continuous phase of the styrene resin is 150,000 to 300,000;

the graft ratio of the styrene resin to the diene polymer is 70 to 135%; and, the swelling index of the gel fraction of said diene polymer in toluene at 25OC. is 12 to 25.

According to the present invention, an expandable rubber-modified styrene resin composition that is enabled to obtain a molded foam having a high expansion ratio, excellent impact resistance and pliability and satisfactory appearance can be provided.

DETAILED DESCRIPTION OF THE INVENTION

The styrene resin described above can for example be produced by dissolving a diene polymer in an aromatic vinyl compound such as styrene, p-methylstyrene and α-methylstyrene followed by effecting radical polymerization in the presence of an azo compound such as azobisisobutyronitrile or a peroxide such as benzoyl peroxide and t-butylperoxybenzoate with employing bulk polymerization, solution polymerization, suspension polymerization, bulk-suspension polymerization or the like.

The weight-average molecular weight of the styrene resin described above is 150,000 to 300,000. When the weight-average molecular weight is less than 150,000, strength of a molded foam may become lower, while that exceeding 300,000 causes difficulty in producing a molded foam. The weight-average molecular weight is preferably 180,000 to 250,000.

The diene polymer described above can be a polymer of a diene compound such as butadiene and isoprene or a copolymer with an aromatic vinyl compound such as styrene capable of being copolymerized with a diene compound. Preferably, a butadiene polymer is employed.

Preferably, the rubber-modified styrene resin described above preferably contains 5 to 20% by weight of a diene polymer.

A content less than 5% by weight may cause difficulty in obtaining a molded foam having satisfactory impact resistance and pliability. On the other hand, a content exceeding 20% by weight may not provide an increase in strength corresponding to an increase in the amount and results in adverse effects on moldability such as melting of the surface of the molded foam.

More preferably, the content is in a range of 7 to 15% by weight.

The graft ratio of a styrene resin to a diene polymer is in a range of 70 to 135%. A graft ratio less than 70% may not provide a molded foam having sufficient impact resistance and pliability. On the other hand, a graft ratio exceeding 135% may not cause much orientation of the rubber particle in a foam membrane, resulting in difficulty in foaming, which may lead to shrinkage or deformation in a molded foam of a high expansion ratio. Preferably, the graft ratio is 80 to 130%. More preferably, the ratio is 100 to 120%.

The graft ratio described above is a value defined as follows.

[Graft ratio]=[Gel fraction-Diene polymer content]×100/[Diene polymer content]

The content described above is the weight (%) based on the rubber-modified styrene resin.

The swelling index of the gel fraction of the diene polymer in toluene at 25° C. is 12 to 25. A swelling rate of the gel fraction less than 12 may not cause much orientation of the rubber particle in a foam membrane, resulting in difficulty in foaming, which may lead to shrinkage or deformation in a molded foam of a high expansion ratio. On the other hand, a swelling index exceeding 25 does not allow a molded foam having sufficient impact resistance and pliability. Preferably, the swelling index is 13 to 20. More preferably, the swelling index is 15 to 20.

The swelling index of the gel fraction of a diene polymer is a value defined as follows.

[swelling index]=[Weight of gel swollen in toluene at 25° C.]/
    [Dry gel weight]

In an expandable rubber-modified styrene resin composition, 85 to 99% by weight of a rubber-modified styrene resin described above is contained.

A volatile blowing agent having a boiling point of 80° C. or lower is employed.

In an expandable rubber-modified styrene resin composition, the volatile blowing agent described above is contained in an amount of 1 to 15% by weight. A content less than 1% by weight results in an insufficient foaming capability, and accordingly a predetermined expansion ratio can not be achieved. On the other hand, a content exceeding 15% by weight involves a problem that shrinkage and deformation may occur when producing a molded foam.

The volatile blowing agent described above can be an organic compound having a boiling point of 80° C. or lower such as propane, butane, isobutane, pentane, isopentane, neopentane, cyclopentane, hexane, trichlorofluoromethane, dichlorofluoromethane, dichlorotetrafluoroethane, chloromethane, dichloromethane, methanol, diethylether and the like, which may be used singly or in combination.

Preferably, the expandable rubber-modified styrene resin composition described above contains a plasticizer for the purpose of imparting the molded foam with pliability.

Such a plasticizer can be esters such as dioctyl phthalate and dioctyl adipate, hydrocarbons such as toluene, xylene and cyclohexane, fatty esters of polyhydric alcohols such as glycerin tristearate and glycerin trioctoate as well as mineral oils, liquid paraffin and the like.

The expandable rubber-modified styrene resin composition described above may also contain one or more additives such as inorganic fillers, lubricants, flame retardants, antioxidants, antistatic agents, UV absorbers and carbon black.

Thus, an expandable rubber-modified styrene resin composition may contain inorganic fillers such as talc, clay, calcium carbonate and titanium oxide, lubricants such as aluminum p-t-butylbenzoate and ethylene bis-stearylamide, flame retardants such as tris(dibromopropyl)phosphate, pentabromodiphenylether, tetrabromobutane, dibromoethylbenzol and 1,2,5,6,9,10-hexabromocyclodecane, as well as antioxidants, antistatic agents, UV absorbers and carbon black and the like.

The particle size of the diene polymer rubber particle dispersed in the continuous phase of a styrene polymer is preferably 2 to 10 $\mu$m.

A particle size less than 2 $\mu$m may cause difficulty in obtaining a molded foam having sufficient impact resistance and pliability. On the other hand, a particle size exceeding 10 $\mu$m may result in too large a rubber particle to effect appropriate expanding, which may lead to shrinkage and deformation when producing a molded foam. More preferably, the particle size is 3 to 7 $\mu$m.

Preferably, a diene polymer comprises a 1,4-cis structure at a ratio of 80% or more.

A ratio of the 1,4-cis structure less than 80% may yield a molded foam having insufficient pliability and impact resistance when an inventive expandable composition is employed. More preferably, the ratio is 90% or more, or the entire of the polymer is in the 1,4-cis structure.

The expandable rubber-modified styrene resin composition described above can be produced by, for example, kneading and fusing a rubber-modified styrene resin and a volatile blowing agent in an extruder, extruding via a pore of the die on the tip of the extruder, introducing into water for rapid cooling, pelletizing still in the state of a non-expanded material, whereby producing an expandable rubber-modified styrene resin composition.

Alternatively, a rubber-modified styrene resin can be kneaded and fused in an extruder and extruded via a pore of the die on the tip of the extruder, and pelletized by strand cut, hot cut, under water cut and the like into a particle having a size of 0.5 to 5 mg/piece, and the particle of the rubber-modified styrene resin thus obtained is placed in an autoclave and dispersed in an aqueous medium in the presence of a suspending agent, and the resin particle is impregnated with a volatile blowing agent, whereby producing an expandable rubber-modified styrene resin composition.

An expandable rubber-modified styrene resin composition according to the present invention is pre-expanded by heating to obtain a pre-expanded bead of a rubber-modified styrene resin.

In the obtained pre-expanded beads, the rubber particles are flatly dispersed in the surface direction of a foam membrane of the pre-expanded beads. When the foam membrane is observed in section in the thickness direction, the relation between the rubber particles, which laminarly present in plural, is characterized in that the average amount of the aspect ratio (b/a) of a size of the rubber particle in the surface direction of the foam membrane (b) to a size of the rubber particle in the thickness direction of the foam membrane (a) is more than 60. The average value is preferably more than 70, and further preferably more than 80. When this value is less than 60, the physical properties, such as resistance to cracking, are lowered, and thus sufficient impact resistance and pliability may not be obtained. The pre-expanding can be effected by, for example, heating to a temperature close to a glass transition temperature of the rubber-modified styrene resin (about 100° C.) with use of steaming carried out by a pre-expander for polystyrene beads.

The pre-expanded bead of a rubber-modified styrene resin can also be molded using a molding machine employed for production of a polystyrene molded foam. Namely, the pre-expanded bead is packed in a mold, which is then heated by a steam to post-expand the pre-expanded bead and fuse the pre-expanded bead to each other, and after cooling for a certain period the molded foam is released from the mold. The density of the molded foam article in this case is usually in a range of 14 to 50 kg/m$^3$ and preferably 16 to 20 kg/m$^3$. When the density of the molded foam article exceeds 50 kg/m$^3$, the production cost may be increased. When the density of the molded foam article is less than 14 kg/m$^3$, the strength may be weakened. The molded foam article thus obtained having a high quality with an excellent impact resistance, wherein the 50% failure height in a fallen ball impact test is more than 40 cm at 50–55× expanding magnification, and moreover, this article can be easily obtained.

EMBODIMENTS

An expandable rubber-modified styrene resin composition and a method for producing the same according to the embodiment of the present invention are described below sequentially with referring to typical examples.

Examples 1 to 5 and Comparative Examples 1 and 2

(1) Method for Producing Rubber-Modified Styrene Resin

A rubber-modified styrene resin was produced by bulk polymerization.

Thus, 100 parts by weight of a styrene monomer was intermixed and dissolved with 10 parts by weight of butadiene polymer, 0.03 parts by weight of t-butylperoxybenzoate and 12 parts by weight of ethylbenzene. The mixture was continuously pumped into a 30 L reactor fitted with a stirrer at the average residence time of 2.5 hours, whereby effecting the polymerization of the styrene monomer at a temperature of 110 to 130° C.

Subsequently, the reaction mixture thus obtained was pumped continuously to two groups of PLUGFLOW-type reactors, in which polymerization reaction was conducted at temperatures of 120 to 130° C. and 150 to 180° C., respectively, until final polymer conversion became 80 to 90%. Thereafter, unreacted styrene monomer and the solvent were removed by evaporation under a reduced pressure with heating, and the mixture was pelletized to obtain an intended rubber-modified styrene resin.

Based on the polymerization procedure described above but varying the temperature of the reactor and the evaporation tank, rubber-modified styrene resins having different graft ratios, different gel swelling index and different rubber particle sizes were obtained. Also by varying the concentration of the butadiene polymer to be supplied to the styrene monomer described above, the butadiene polymer content in the rubber-modified styrene resin was adjusted.

(2) Method for Producing Expandable Rubber-Modified Styrene Resin Composition

Each of the rubber-modified styrene resins obtained as described above (Table 1) was fluxed by means of a 65 mm single extruder, cut under water to obtain a resin particle having a size of about 1.3 mg/piece. Subsequently, a 3 L autoclave fitted with a stirrer was charged with 100 parts by weight of each resin particle described above, 150 parts by weight of deionized water, 0.7 parts by weight of sodium pyrophosphate, 1.4 parts by weight of magnesium sulfate, 3 parts by weight of sodium sulfate and 0.075 parts by weight of sodium lauryl sulfate, and the reactor was then closed tightly.

After heating the autoclave to 100° C. with stirring, a volatile blowing agent consisting of 4 parts by weight of pentane and 8 parts by weight of butane was pressed into the autoclave, which was then kept at 100° C. for 5 hours. After cooling to 30° C., the resin particle impregnated with the blowing agent was recovered and washed with water and dehydrated.

Then the resin particle was put into a cylindrical metal container fitted with 0.1 mm mesh size sieves provided with the each end of the metal container, and dried nitrogen at room temperature was introduced from the bottom of the cylindrical metal container at the flow rate of 500 L per minute over a period of 10 minutes to dry the particle. As a result, an expandable rubber-modified styrene resin composition was obtained.

(3) Production of Pre-Expanded Bead and Molded Foam

100 Parts by weight of the resin particle of an expandable rubber-modified styrene resin composition obtained as described above was coated with a mixture of 0.04 parts by weight of an antistatic agent and 0.06 parts by weight of an anti-lumping agent, and then allowed to stand at 0° C. for 24 hours.

Then pre-expansion by about 55 times was conducted by introducing a steam at 0.1 MPa using a stirrer-fitted batch pre-expander for an expandable polystyrene and then a pre-expanded bead of the rubber-modified styrene resin was obtained.

After allowing the obtained pre-expanded bead to stand at room temperature for one day, a molded foam of the rubber-modified styrene resin was produced using a molding machine for polystyrene foaming molding (Model VS-500; manufactured by Daisen Industry Co., Ltd.).

(4) Evaluation of Expandable Rubber-Modified Styrene Resin Compositions

1) Weight-Average Molecular Weight of Styrene Resin Continuous Phase

A rubber-modified styrene resin was dissolved in THF (tetrahydrofuran) and the insolubles were filtered off with a membrane filter, and then the weight-average molecular weight was determined by gel permeation chromatography (GPC).

2) Swelling Index of Gel fraction of Diene Polymer

About 1 g of an expandable rubber-modified styrene resin composition was admixed with 30 ml of methylethylketone, allowed to be dipped at 25° C. for 24 hours, shaken for 5 hours, and then centrifuged at 5° C. and 18,000 rpm for 1 hour.

After decanting the supernatant off, 30 ml of toluene was newly added and the mixture was subjected to shaking at 25° C. for 1 hour followed by centrifugation at 5° C. and 18,000 rpm for 2 hours. After removing the supernatant, the centrifugal pellet was weighed (weight of gel swollen in toluene at 25° C.).

After drying in vacuum at 60° C. for 8 hours, the residue was weighed (dry gel weight). The gel swelling index was determined according to the formula shown below.

[Swelling index]=[Weight of gel swollen in toluene at 25° C.]/[Dry gel weight]

3) Graft Ratio

The graft ratio was calculated according to the formula shown below.

[Graft ratio]=[% Gel by weight−% Diene polymer by weight]× 100/[% Diene polymer by weight]

4) Particle Size of Diene Polymer Rubber Particle

The particle size of a diene polymer rubber particle was determined by analysis of the rubber particle dispersed in DMF(dimethylformamide) as a solvent using a laser diffraction/scattering particle size distribution analyzer model LA-700 manufactured by HORIBA SEISAKUSHO Co., Ltd. followed by calculation from the volume-based particle size distribution obtained according to the formula shown below.

[Particle size]=[$\Sigma Di^4 \times Ni$]/[$\Sigma Di^3 \times Ni$]Ni=Pi/[$Di^3 \times \pi/6$]

The above Di denotes the particle size of the particle No.i, and Pi denotes the volume frequency of No.i, and $\pi$ is the ratio of the circumference.

5) Volatile Blowing Agent Content

A weighed sample, i.e., an expandable rubber-modified styrene resin composition was heated at 120° C. for 4 hours, weighed to obtain the difference between the weight before heating and that after heating which was used to calculate the total volatile content (% by weight) from which the water content (% by weight) determined by Karl Fischer method was subtracted to give the volatile blowing agent content. Volatile blowing agent content (% by weight)=[Sample weight after heating (g)×100/Sample weight before heating (g)] −water content (% by weight)

6) Molded foam density

From the weight of a molded foam (kg) and the volume of the molded foam (m$^3$)based on a mold size, the molded foam density (kg/m$^3$) was obtained.

7) Surface Appearance

The appearance of the surface of a molded foam was evaluated according to the criteria shown below.

◯: Almost no shrinkage, burned surface or voids were observed.

Δ: Shrinkage, burned surface or voids were observed.

X: Marked shrinkage, burned surface or voids were observed.

The term "burned surface" used here means a condition that the surface of a molded foam had been melted due to the heating upon molding.

8) 50% Failure Height

A molded foam was cut into test pieces each being 200 mm in length, 40 mm in width and 25 mm in thickness, onto which a 255 g steel ball was fallen down to determine the 50% failure height (cm) in accordance with JIS K 7211 (Japanese Industrial Standard). Based on the height thus obtained, the impact resistance was evaluated.

9) Pliability

A molded foam was cut into test pieces each being 200 mm in length, 30 mm in width and 20 mm in thickness. 10 metal cylinders having diameters ranging from 100 to 10 mm were provided and the center of each test piece was pressed against a cylinder and wound around the cylinder at a constant speed for about 5 seconds.

(10) Aspect Ratio (b/a)

An aspect ratio (b/a) is defined as a ratio of a size of the rubber particle in the surface direction of the foam membrane (b) to a size of the rubber particle in the thickness direction of the foam membrane (a). The rubber particles are flatly dispersed in the surface direction of the foam membrane of the pre-expanded beads and laminarly present in plural when the foam membrane is observed in a section in the thickness direction. The aspect ratio (b/a) was measured by the following process.

Initially, part of the pre-expanded bead was cut out and then embedded in a low-viscosity epoxy resin. Then, the obtained was dipped in an osmium oxide ($O_sO_4$) solution followed by preparation of an ultra-thin pellicle slice using a microtome. The values (a) and (b) was measured by transmission electron microscope observation. The aspect ratio (b/a) was determined as an average value of the aspect ratio of 25 of the rubber particles randomly selected.

The test was started with the cylinder having the diameter of 100 mm, and when the test piece was not broken then the cylinder having the diameter which was shorter by 10 mm than that of the previous cylinder was used to conduct the test similarly. Until the piece was broken, the test was continued successively with a series of the cylinder having the diameter which was shorter by 10 mm than that of the previous cylinder. Once the test piece was broken, the diameter of the previous cylinder was recorded. Pliability was judged based on the mean value (mm) of 10 test pieces. Thus a lower value represented a higher pliability.

The results of Examples and Comparatives are shown in Table 1.

The results shown in Table 1 indicated the characteristics described below.

Thus, the molded foams of Examples 1 to 5 according to the present invention exhibited excellent appearance of the surface of the molded foams, higher impact resistance (50% failure height) and satisfactory pliability, even at a high expansion ratio (×55, density: about 18 kg/m³).

On the other hand, when a rubber-modified styrene resin having a higher graft ratio and a lower swelling index (Comparative Examples 1 and 2) was employed, the impact resistance and the pliability were poor at a high expansion ratio.

TABLE 1

| | Examples | | | | | Comparatives | |
|---|---|---|---|---|---|---|---|
| | 1 | 2 | 3 | 4 | 5 | 1 | 2 |
| Weight-average molecule weight (×10⁴) | 26 | 26 | 22 | 23 | 22 | 22 | 20 |
| Graft ratio (%) | 90 | 110 | 80 | 100 | 133 | 140 | 137 |
| Swelling index | 15 | 15 | 21 | 16 | 12 | 10 | 11 |
| Rubber particle size (μm) | 5 | 4 | 5 | 5 | 3 | 3 | 1.5 |
| Ratio of cis structure (wt %) | 98 | 98 | 98 | 40 | 98 | 98 | 98 |
| Butadiene polymer content (wt %) | 11 | 12 | 11 | 10 | 10 | 12 | 8 |
| Volatilize foaming agent content (%) | 6.7 | 6.5 | 6.8 | 7.0 | 6.8 | 6.8 | 6.7 |
| Molded foam density (kg/m³) | 18.0 | 18.5 | 18.1 | 17.9 | 18.0 | 18.6 | 18.1 |
| Surface appearance (○/Δ/X) | ○ | ○ | ○ | ○ | ○ | ○ | ○ |
| 50% failure height (cm) | 52 | 48 | 46 | 46 | 43 | 38 | 34 |
| Pliability (mm) | 52 | 61 | 50 | 65 | 53 | 69 | 70 |
| Aspect ratio (b/a) | 120 | 107 | 136 | 90 | 76 | 35 | 44 |

What is claimed is:

1. An expandable rubber-modified styrene resin composition comprising 85 to 99% by weight of a rubber-modified styrene resin containing a rubber particle of a diene polymer which is a homopolymer of butadiene or isoprene, dispersed in a continuous phase of a styrene resin and 1 to 15% by weight of a volatile blowing agent whose boiling point is 80° C. or lower, wherein:

the weight-average molecular weight of said continuous phase of the styrene is 150,000 to 300,000;

the graft ratio of the styrene resin to the diene polymer is 70 to 135%; and, the swelling index of the gel fraction of said diene polymer in toluene at 25° C. is 12 to 25, wherein graft ratio is defined as (Gel content—Diene polymer content)×100/(Diene polymer content), and wherein gel content is the value in weight percent of a dry gel to the rubber-modified styrene resin.

2. An expandable rubber-modified styrene resin composition according to claim 1, wherein said diene polymer comprises a 1,4-cis structure at a ratio of 80% or more.

3. An expandable rubber-modified styrene resin composition according to claim 1, wherein said rubber-modified styrene resin contains 5 to 20% by weight of a diene polymer.

4. An expandable rubber-modified styrene resin composition according to claim 1, wherein the expandable rubber-modified styrene resin composition contains a pliability adjusting agent for the purpose of imparting pliability thereto.

5. A molded foam comprising a rubber-modified styrene resin composition comprising a rubber particle of a diene polymer which is a homopolymer of butadiene or isoprene, dispersed in a continuous phase of a styrene resin, wherein:

the weight-average molecular weight of said continuous phase of the styrene is 150,000 to 300,000;

the graft ratio of the styrene resin to the diene polymer is 70 to 135%;

the swelling index of the gel fraction of said diene polymer in toluene at 25 ° C. is 12 to 25; and the density is in a range of 14 to 50 kg/m³, wherein graft ratio is defined as (Gel content—Diene polymer content)×100/(Diene polymer content), and wherein gel content is the value in weight percent of a dry gel to the rubber-modified styrene resin.

6. A molded foam according to claim 5, wherein a 50% failure height at a falling ball impact test is 40 cm or more when the molded foam article comprises a density of 18 to 20 kg/m$^3$.

7. A molded foam according to claim 5, wherein said rubber particles in the pre-expanded bead forming the molded foam are flatly dispersed in the surface direction of a foam membrane of the pre-expanded bead and laminarly present in plural when the foam membrane is observed in a section in the thickness direction, wherein an average amount of an aspect ratio(b/a) of a size of the rubber particle in the surface direction of the foam membrane (b) to a size of the rubber particle in the thickness direction of the foam membrane (a), is 60 or more.

8. A molded foam according to claim 5, wherein said diene polymer comprises a 1,4-cis structure at a ratio of 80% or more.

9. A molded foam according to claim 5, wherein said rubber-modified styrene resin contains 5 to 20% by weight of a diene polymer.

10. A molded foam according to claim 5, wherein the expandable rubber-modified styrene resin composition contains a plasticizer for the purpose of imparting pliability thereto.

11. A molded foam comprising a rubber-modified styrene resin composition comprising a rubber particle of a diene polymer which is a homopolymer of butadiene or isoprene, dispersed in a continuous phase of a styrene resin, wherein:

the weight-average molecular weight of said continuous phase of the styrene is 150,000 to 300,000;

the graft ratio of the styrene resin to the diene polymer is 70 to 135%;

the swelling index of the gel fraction of said diene polymer in toluene at 25° C. is 12 to 25; and the density is in a range of 14 to 50 kg/m$^3$, wherein graft ratio is defined as (Gel content—Diene polymer content)×100/(Diene polymer content), wherein gel content is the value in weight percent of a dry gel to the rubber-modified styrene resin; and wherein said rubber particles in the pre-expanded bead forming the molded foam are flatly dispersed in the surface direction of a foam membrane of the pre-expanded bead and laminarly present in plural when the foam membrane is observed in a section in the thickness direction, wherein an average amount of an aspect ratio (b/a) of a size of the rubber particle in the surface direction of the foam membrane (b) to a size of the rubber particle in the thickness direction of the foam membrane (a), is 60 or more.

12. The molded foam according to claim 11 wherein the aspect ratio is 76 or more.

13. An expandable rubber-modified styrene resin composition according to claim 1, wherein said rubber particle of the diene polymer dispersed in the continuous phase of the styrene resin has a particle diameter of 2 to 10 μm.

* * * * *

UNITED STATES PATENT AND TRADEMARK OFFICE
CERTIFICATE OF CORRECTION

PATENT NO. : 6,232,358 B1  
DATED : May 15, 2001  
INVENTOR(S) : Haraguchi et al.

Page 1 of 1

It is certified that error appears in the above-identified patent and that said Letters Patent is hereby corrected as shown below:

Title page,
Item [73], the Assignee information should read:

[73] Assignees: Mitsubishi Chemical Foam Plastic Corporation; Mitsubishi Chemical Corporation, both of Tokyo (JP)

Signed and Sealed this

Nineteenth Day of February, 2002

Attest:

JAMES E. ROGAN  
*Attesting Officer*  *Director of the United States Patent and Trademark Office*

UNITED STATES PATENT AND TRADEMARK OFFICE
CERTIFICATE OF CORRECTION

PATENT NO. : 6,232,358 B1
DATED : May 15, 2001
INVENTOR(S) : Kenji Haraguchi et al.

It is certified that error appears in the above-identified patent and that said Letters Patent is hereby corrected as shown below:

Column 1,
Line 62, "250C" should read -- 25°C --.

Signed and Sealed this

Twenty-seventh Day of August, 2002

Attest:

JAMES E. ROGAN
Attesting Officer
Director of the United States Patent and Trademark Office